United States Patent [19]

Banerjee

[11] Patent Number: 5,064,787

[45] Date of Patent: Nov. 12, 1991

[54] RAMMING COMPOSITIONS

[75] Inventor: Subrata Banerjee, Glen Ellyn, Ill.

[73] Assignee: Magneco/Metrel, Inc., Addison, Ill.

[21] Appl. No.: 439,419

[22] Filed: Nov. 20, 1989

[51] Int. Cl.$^5$ .............................................. C04B 35/52
[52] U.S. Cl. ........................................ 501/89; 501/90; 501/100; 501/128; 106/38.28
[58] Field of Search ................... 501/99, 100, 133, 87, 501/89, 128, 129; 106/38.28, 481, 483, 486

[56] References Cited

U.S. PATENT DOCUMENTS

| | | | |
|---|---|---|---|
| 3,067,050 | 12/1962 | Miller et al. | 106/65 |
| 3,892,584 | 7/1975 | Takeda et al. | 106/56 |
| 3,920,578 | 11/1976 | Yates | 252/313 S |
| 4,018,615 | 4/1977 | Mills | 106/69 |
| 4,041,199 | 8/1977 | Cartwright | 428/36 |
| 4,056,399 | 11/1977 | Kirkpatrick et al. | 106/69 |
| 4,061,501 | 12/1977 | Ivarsson et al. | 106/44 |
| 4,069,057 | 1/1978 | Kamei et al. | 106/55 |
| 4,128,431 | 12/1978 | Svec | 106/38.35 |
| 4,139,393 | 2/1979 | Chandhok | 106/38.3 |
| 4,226,625 | 10/1980 | Delcorio et al. | 106/38.22 |
| 4,327,185 | 4/1982 | Bonsall | 501/89 |
| 4,331,773 | 5/1982 | Hongo et al. | 501/128 |
| 4,342,597 | 8/1982 | Brown | 106/38.27 |
| 4,476,234 | 10/1984 | Jones et al. | 501/89 |
| 4,751,204 | 6/1988 | Kyoden et al. | 501/89 |
| 4,780,142 | 10/1988 | Rechter | 106/84 |
| 4,800,181 | 1/1989 | Lassiter et al. | 501/89 |
| 4,916,092 | 4/1990 | Tiegs et al. | 501/89 |

FOREIGN PATENT DOCUMENTS

| | | |
|---|---|---|
| 0032602 | 7/1981 | European Pat. Off. . |
| 0193751 | 9/1986 | European Pat. Off. . |
| 0338174 | 10/1989 | European Pat. Off. . |
| 8017506 | 7/1971 | Japan . |
| 065558 | 8/1971 | Japan . |
| 104774 | 8/1981 | Japan . |
| 1101455 | 10/1984 | Japan . |
| 1158872 | 12/1984 | Japan . |
| 2023566 | 1/1980 | United Kingdom . |

OTHER PUBLICATIONS

"Hawley's Condensed Chemical Dictionary" Eleventh Ed. Pub--Van Nostrand Reinhold Co.-N.Y. p. 433.
Stewart's Scientific Dictionary, Fourth Edition, by Jeffrey R. Stewart, pp. 225-226 and Ceramic Industry, Jan. 1990, p. 54.

*Primary Examiner*—William R. Dixon, Jr.
*Assistant Examiner*—Chris Gallo
*Attorney, Agent, or Firm*—Willian Brinks Olds Hofer Gilson & Lione

[57] ABSTRACT

An improved ramming composition for use in the iron and steel industry includes between 65-80% by weight mullite, 5-15% by weight silicon carbide, 2-5% by weight graphite, 2-6% by weight ball clay, and 5-10% by weight of a binder formed from a dispersion of 15-70% by weight silica in water. The silica binder replaces binders composed of petroleum pitch, clay, or other organic materials. The silica binder causes the ramming composition to have a longer use life, increased strength, and reduced tendency to crack, oxidize or smoke.

10 Claims, No Drawings

RAMMING COMPOSITIONS

BACKGROUND AND SUMMARY OF THE INVENTION

This invention relates to a ramming composition for use as a temperature-stable patching and lining material in the iron and steel industry. When compared with known ramming compositions, the composition of the invention has a longer use life, exhibits increased strength, is less prone to cracking and is less hazardous to the users' health.

The ramming composition of the invention is based on a refractory material, preferably mullite, and a binder material which includes very fine silica particles dispersed in water. The preferred composition also includes smaller amounts of silicon carbide, graphite, and clay. Specifically, the preferred ramming composition includes 65-80% by weight of mullite, 5-15% by weight of silicon carbide, 2-5% by weight of graphite, 2-6% by weight of ball clay, and 5-10% by weight of the aqueous silica binder system. The foregoing components are preferably mixed to a workability of 8-15% as measured by ASTM Procedure C181-82. The resulting composition is a damp mixture which can be rammed directly to surfaces, including hot surfaces, and then dried.

The use of a silica binder represents an improvement over known ramming compositions which utilize binders based on petroleum pitch, clay and/or other organic resins. Because ramming is usually performed on hot surfaces, compositions which utilize organic binder materials often exhibit noxious fumes. Furthermore, the known compositions have a tendency to oxidize. Oxidation over a period of time severely weakens the known ramming compositions, causing them to crack, crumble and separate from the applied surfaces.

The composition of the invention, on the other hand, is nonhazardous. Furthermore, the use of a silica binder inhibits oxidation and imparts superior strength to the ramming composition of the invention.

DETAILED DESCRIPTION OF THE PRESENTLY PREFERRED EMBODIMENTS

The preferred ramming composition of the invention includes, as a major component, mullite in an amount of between 65-80% by weight. The mullite preferably is in the form of particles having an average diameter of between 30 micrometers and 7 millimeters. The mullite preferably has an alumina content of between 57-73% by weight.

The ramming composition of the invention includes a silica binder which is formed from finely dispersed silica particles in an aqueous medium. Silica having an average diameter of preferably between 4-100 microns, and most preferably 8-14 microns, is initially dispersed in water in an amount of between 15-70% by weight, preferably about 40% by weight. The resulting silica binder is mixed with the other components of the ramming composition in an amount of between 5-10% based on the weight of the ramming composition.

In addition to the foregoing, the ramming composition of the invention preferably includes between 5-15% by weight of silicon carbide. Preferably, the silicon carbide is in the form of particles having an average diameter of between 30 micrometers and 1.5 millimeters. The silicon carbide reduces physical erosion of the ramming composition after application to the receiving surface, and helps prevent the mullite from reacting chemically with slag present in molten steel.

The preferred ramming composition also includes between 2-5% by weight of a graphite material in the form of amorphous graphite, crystalline graphite, graphite flakes, or mixtures thereof. The purpose of the graphite is to further inhibit chemical reaction between the mullite and slag. The graphite acts as a nonwetting agent to help prevent attachment to or penetration of the ramming composition by slag.

Finally, the preferred ramming composition includes between 2-6% by weight of ball clay. Preferably, the ball clay includes 28-30% by weight alumina and 66-70% by weight silica.

In a highly preferred embodiment, the ramming composition of the invention also includes between 5-10% by weight of calcined or sintered alumina. The calcined or sintered alumina reacts with the dispersed silica to form a sediment phase which causes improved bonding to the applied surfaces, particularly at higher temperatures. The calcined or sintered alumina preferably has an average diameter of 5-50 microns.

The foregoing components are mixed together to form a damp mixture having a workability of between 8-15%, as measured by ASTM Procedure C181-82. The resulting ramming composition is applied to receiving surfaces using ramming processes well known in the art. After the water has been evaporated, the ramming composition forms a solid, high temperature-resistant refractory patch or liner for equipment used for the containment and processing of molten iron and steel.

While the embodiments of the invention disclosed herein are at present considered to be preferred, it is understood that various modifications and improvements can be made without departing from the spirit and scope of the invention. The scope of the invention is indicated in the appended claims, and all changes which come within the meaning and range of equivalency of the claims are intended to be embraced therein.

EXAMPLE I

A ramming composition was prepared by mixing the following components together in the stated weight percentages:
a) 75.0% mullite having particle diameters ranging from 0-7 millimeters;
b) 10.0% silicon carbide having particle diameters ranging from 0-1.5 millimeters;
c) 2.5% graphite having particle diameters ranging from 0-0.5 millimeters;
d) 7.5% calcined alumina having particle diameters ranging from 0-0.05 millimeters; and
e) 5.0% ball clay.

Six percent by weight of a silica binder consisting of 40% by weight silica having an average diameter of 10 microns dispersed in an aqueous medium, was then added to and mixed together with the above components.

The resulting ramming composition yielded a temperature-stable patching material having a longer use life, increased strength, and less tendency to crack, crumble or separate from the applied surfaces, than known ramming compositions.

EXAMPLE II

A ramming composition was prepared by mixing the following components together in a stated weight percentages:
a) 80.0% mullite having particle diameters ranging from 0-7 millimeters;
b) 7.5% silicon carbide having particle diameters ranging from 0-1.5 millimeters;
c) 3.5% graphite having particle diameters ranging from 0-0.5 millimeters;
d) 5.0% calcined alumina having particle diameters ranging from 0-0.05 millimeters; and
e) 4.0% ball clay.

Five per cent by weight of a silica binder consisting of 40% by weight silica having an average diameter of 10 microns dispersed in an aqueous medium, was then added to and mixed together with the above components.

The resulting ramming composition yielded a temperature-stable patching material having a longer use life, increased strength, and less tendency to crack, crumble or separate from the applied surfaces, than known ramming compositions.

I claim:
1. A ramming composition, comprising:
65-80% by weight of mullite;
5-15% by weight of silicon carbide;
2-5% by weight of graphite material;
2-6% by weight of ball clay; and
5-10% by weight of a binder formed from a dispersion of 15-70% by weight silica in water;
mixed to a workability of between 8-15%.
2. The ramming composition of claim 1 wherein the mullite comprises particles having an average diameter between 30 micrometers and 7 millimeters.
3. The ramming composition of claim 1 wherein the mullite has an alumina content of 57-73% by weight.
4. The ramming composition of claim 1 wherein the silicon carbide comprises particles having an average diameter between 30 micrometers and 1.5 millimeters.
5. The ramming composition of claim 1 wherein the graphite material is selected from the group consisting of amorphous graphite, crystalline graphite, flake graphite and mixtures thereof.
6. The ramming composition of claim 1 wherein the ball clay comprises between 28-30% by weight alumina and 66-70% by weight silica.
7. The ramming composition of claim 1 further comprising 5-10% by weight calcined alumina.
8. The ramming composition of claim 1 further comprising 5-10% by weight sintered alumina.
9. The ramming composition of claim 1 wherein the binder is formed from a dispersion of about 40% by weight silica in water.
10. The ramming composition of claim 1 after the water has been partially or totally removed.

* * * * *